United States Patent [19]
Scheffel

[11] Patent Number: 6,089,506
[45] Date of Patent: Jul. 18, 2000

[54] THERMAL CENTER FLIGHT INDICATOR FOR GLIDERS

[76] Inventor: Bernd W. Scheffel, Ernst-Haeckel-Strasse 71A, D-80999, München, Germany

[21] Appl. No.: 09/108,085

[22] Filed: Jun. 30, 1998

[30] Foreign Application Priority Data

Jun. 30, 1997 [DE] Germany ............................ 197 27 859
Jul. 19, 1997 [DE] Germany ............................ 197 31 081

[51] Int. Cl.$^7$ ............................ B64C 5/00; B64C 19/00
[52] U.S. Cl. ............................................ 244/75 R; 701/5
[58] Field of Search ..................... 244/16, 220; 701/5, 701/7, 201, 202, 203

[56] References Cited

U.S. PATENT DOCUMENTS

| | | | |
|---|---|---|---|
| 3,798,971 | 3/1974 | Lowrance | 244/16 |
| 4,506,847 | 3/1985 | Norman | 244/16 |
| 4,591,111 | 5/1986 | Laughter | 244/16 |
| 4,725,811 | 2/1988 | Muller et al. | 701/7 |
| 4,728,951 | 3/1988 | Johnson et al. | 701/7 |

*Primary Examiner*—Peter M. Poon
*Assistant Examiner*—Charles R. Ducker, Jr.
*Attorney, Agent, or Firm*—Robert W. Becker & Associates

[57] ABSTRACT

A thermal center flight indicator is provided that serves glider pilots who want to gain altitude by circling in thermals. The indicator is activated when entering a thermal, indicating to a pilot a continually computed approximate position of the center of the thermal relative to the present position and heading. The pilot can iteratively improve his track, thus making better use of the thermal. The indicator comprises a computing unit and an indicator, and computes input signals from a position-fix-unit and a measuring unit for the vertical speed. The computing unit computes a product of vertical speed and position coordinates, and sums up all positive products of position coordinates and vertical speed. The computing unit forms coordinates of a thermal center by dividing the sum of all products of position coordinates and positive vertical speed by a sum of all vertical speeds.

8 Claims, 5 Drawing Sheets

THERMAL CENTER FLIGHT INDICATOR FOR GLIDERS

BACKGROUND OF THE INVENTION

The invention concerns a thermal center flight indicator for gliders which use thermals by flying circles. Methods and devices for finding thermals have been published with DE-4035311C1 and DE-4134633A1. It is the goal of these inventions to improve the use of thermals for gliders by indicating such thermal areas for the pilot before the glider reaches them. These proposed solutions would indeed improve the usability of such thermal energy if they could be turned into reality in a technical way.

It is well-known that, even after finding a thermal, it is difficult for the pilot to find out where the maximum strength of the thermal is. The following search causes loss of time and may also cause the loss of the thermal.

The present invention has the goal of providing a method and an apparatus which assists the pilot when searching the center of the thermal. It is meant to improve the use of thermals with means which are actually available today.

SUMMARY OF THE INVENTION

The solution of the task is based on the computation of the data of the flight path or track and the strength of the lift. As a result, the direction of the thermal relative to the glider's track is indicated to the pilot.

The solution of the task uses a method and an apparatus which collects flight data and compute them and feed them to an indicator or signal unit. A position-fix-unit periodically collects the position and a variometer collects vertical speed. The coordinates are multiplied with the respective values of lift. The sum of all results of the multiplication is then divided by the sum of all values of lift. The result of the divisions are the coordinates of the thermal center of the computed flight track. This thermal center is an approximation of the real center of the thermal. The direction from the present position to the computed center of the thermal is indicated to the pilot. This enables him to fly as if the center of the thermal has been made visible. He will improve his flight track around the indicated center by and by, i.e. iteratively. This way, the number of data increases as well as the precision of the indicated direction.

The advantages of the invention are in the direct information of the pilot regarding the position of the invisible center of the thermal. This way he can optimize his flight track fast and in a positive way. This results in a gain of time during performance flights. Further, the pilots chance is improved that he will find the center in situations with weak lift. Another advantage is that it is possible to leave the thermal for a short time and reenter without losing the information about the position of the center of the thermal.

BRIEF DESCRIPTION OF THE DRAWING

Special realizations of the invention are described in the claims. The invention will be explained with the following drawings:

DESCRIPTION OF PREFERRED EMBODIMENTS

Figure 1:
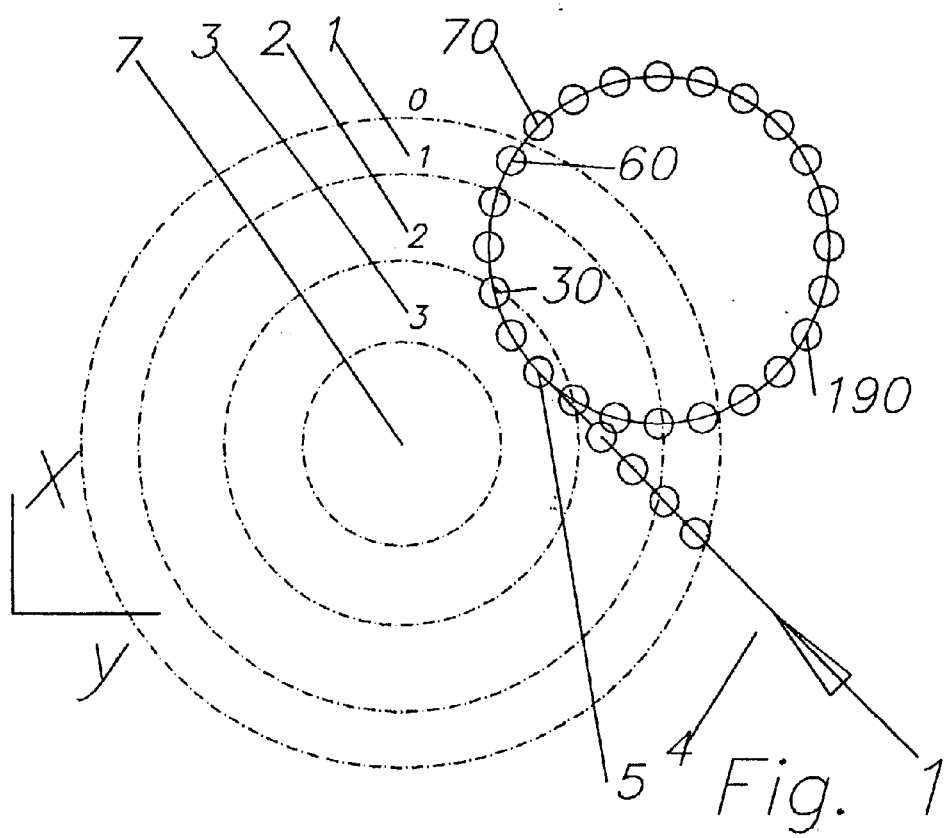
FIG. 1 shows a horizontal sectional view of an air mass containing a thermal and the track of a glider.

FIG. 1 shows a horizontal sectional view through a thermal. The lift increases from the outside towards the center (7) and in different distances from the center, for example, at the position (1) reads 1 [m/s], at the position (2) reads 2 [m/s] and at the position (3) reads 3 [m/s]. If a glider enters the thermal on the track (4), the pilot will realize increasing lift up to position (5). If he starts a right turn at position (5), he will find decreasing lift along the position (30) to (60). After position (70) he will find no lift. If he would continue the circular flight, he would gain little altitude because the track uses the thermal only partially. He can only gain more altitude after adjusting his circular track of flight around the center of the thermal; that means after shifting the flight towards the direction of the center (7) of the thermal. A well-experienced pilot memorizes the heading at which the lift increases. Then, during continuation of the circular flight, he will increase the radius of his circle when reaching this heading approximately at position (190) and then will continue to fly with a reduced radius. This way, the circular track would be shifted. This method could be used repeatedly.

During practical flying, however, centering of flight has some difficulties. In the first place, the pilot needs experience and training in order to memorize the position of the lift during circular flight. Because the lift is very difficult to detect, especially at the borders of the thermal, even well-experienced pilots have difficulties recognizing the heading which is necessary for centering the track. There is a further difficulty to improve the flight track around the center because the sectional shape of the thermals usually deviate from the circular shape.

Figure 2:
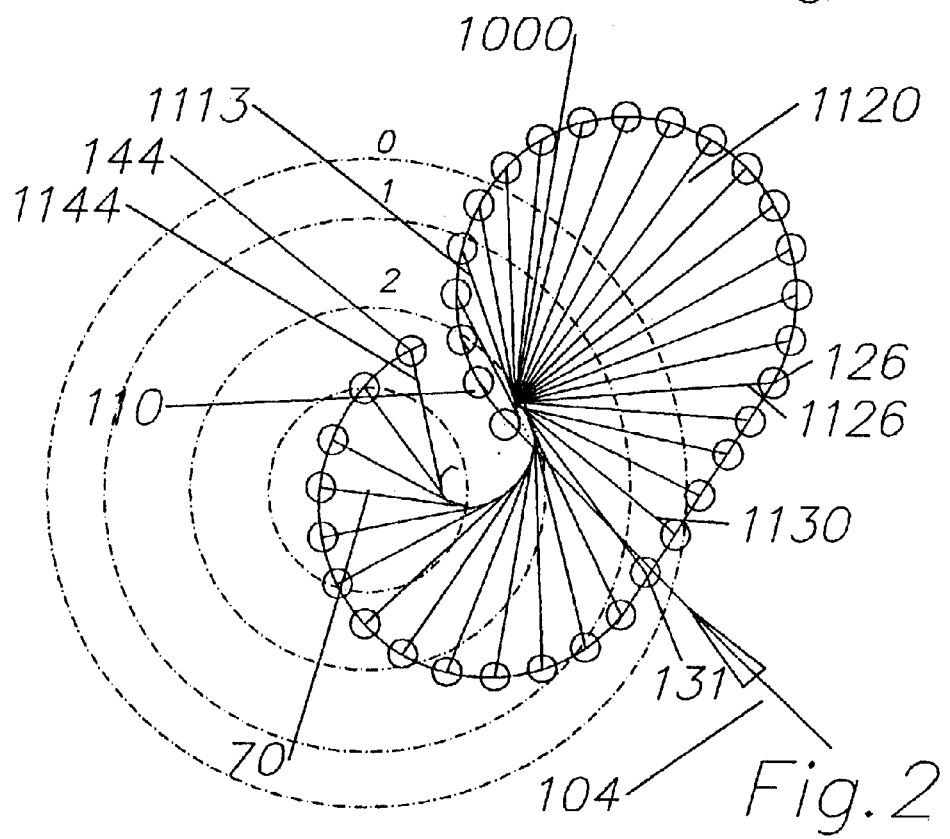
FIG. 2 shows the track in a thermal which has been adjusted by the pilot with a device of the invention.

FIG. 2 shows the same starting situation as FIG. 1. However, the flight track has been adjusted using the center flight indicator of the invention. Meanwhile the thermal center flight indicator has recomputed the position of the thermal lift center over and over. After arriving (104) and starting the circular flight at position (110), vectors for the position of the computed center (1000) can be seen, for example, vector (1113, 1120, 1126). These vectors are indicated to the pilot as a measure of center angle by an indicator or signal unit. The center angle is formed between the center vector (for example 1113, 1120, 1126) and the line which connects the old and the new position. For example, at point 126, the pilot, after taking notice of the vector (1126) which is pointed sideways and to the front, may interrupt the circular flight by a short, straight flight until the vector (1130) points towards the center which is situated orthogonally to his flight track. An acoustic signal could also be given if the center angle approaches a value which equals a vector (1130) that points orthogonally to the right. By this acoustic signal the pilot would be reminded to finish his straight-ahead flight and reenter the circular flight. During the following circular flight, along the points (131–144), the flight track is already much closer towards the center (70) of the thermal. Improved at the same time are the indications for the direction to the center, which the pilot receives from the center flight indicator. At position (144), the directional vector (1144), defers only a little from the center of the thermal. While taking notice of the indications, the pilot can improve the center repeatedly. He reaches his optimal flight track in the thermal if the indicator constantly shows a center which is orthogonal to the flight track.

Figure 3:
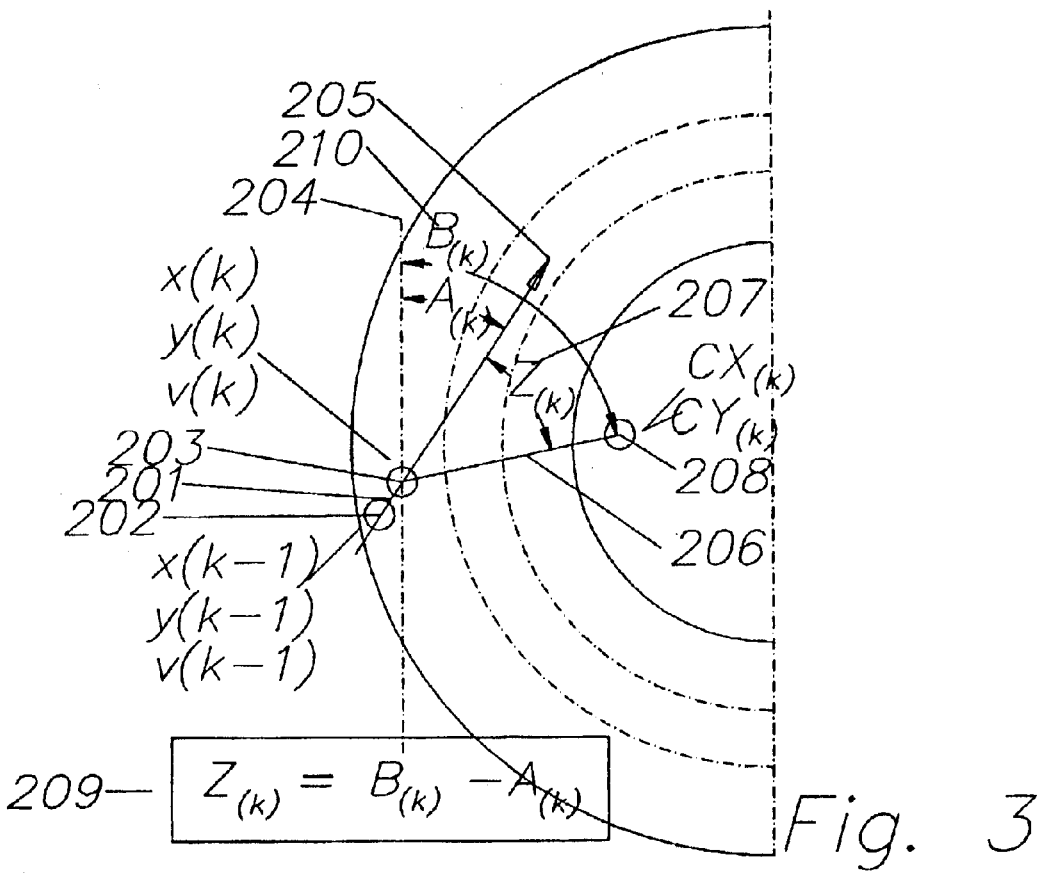
FIG. 3 shows the angular parameters during the computation of the center.

FIG. 3 shows a flight track (201) in a horizontal sectional view of a thermal between position (202) and (203). The position (202) has been recorded one cycle earlier than position (203). The angular relationships are shown between north heading (204), heading A (205) and center-vector (206) and azimuth or bearing B (210) of the computed center (208) of the thermal. The indicated angle Z (207) is computed by formula (209). Using formula (211), the azimuth B (210) of the computed center (208) is computed. The computation of heading A is achieved according to formula (212).

Figure 4:
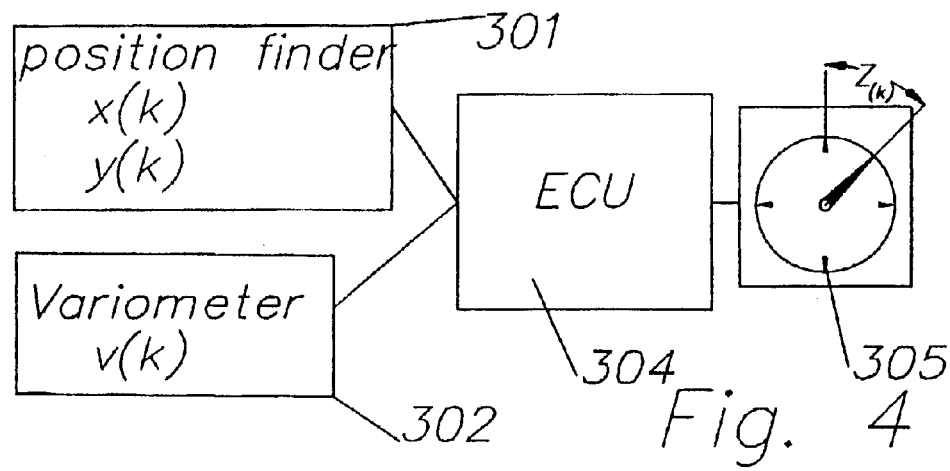
FIG. 4 shows a schematic of the apparatus.

FIG. 4 shows a schematic of the center flight indicator. Position fix system (301) and variometer (302) are shown as the sources for imput data. These input data go to the electronic computing unit ECU (304). From there, the signals go to the indicator (305). Using known methods, the direction and the velocity of the wind can be computed using the position fix data. In case that an extra system is used to compute the wind direction and wind velocity FIG. 4 has to be amended accordingly.

Figure 5:
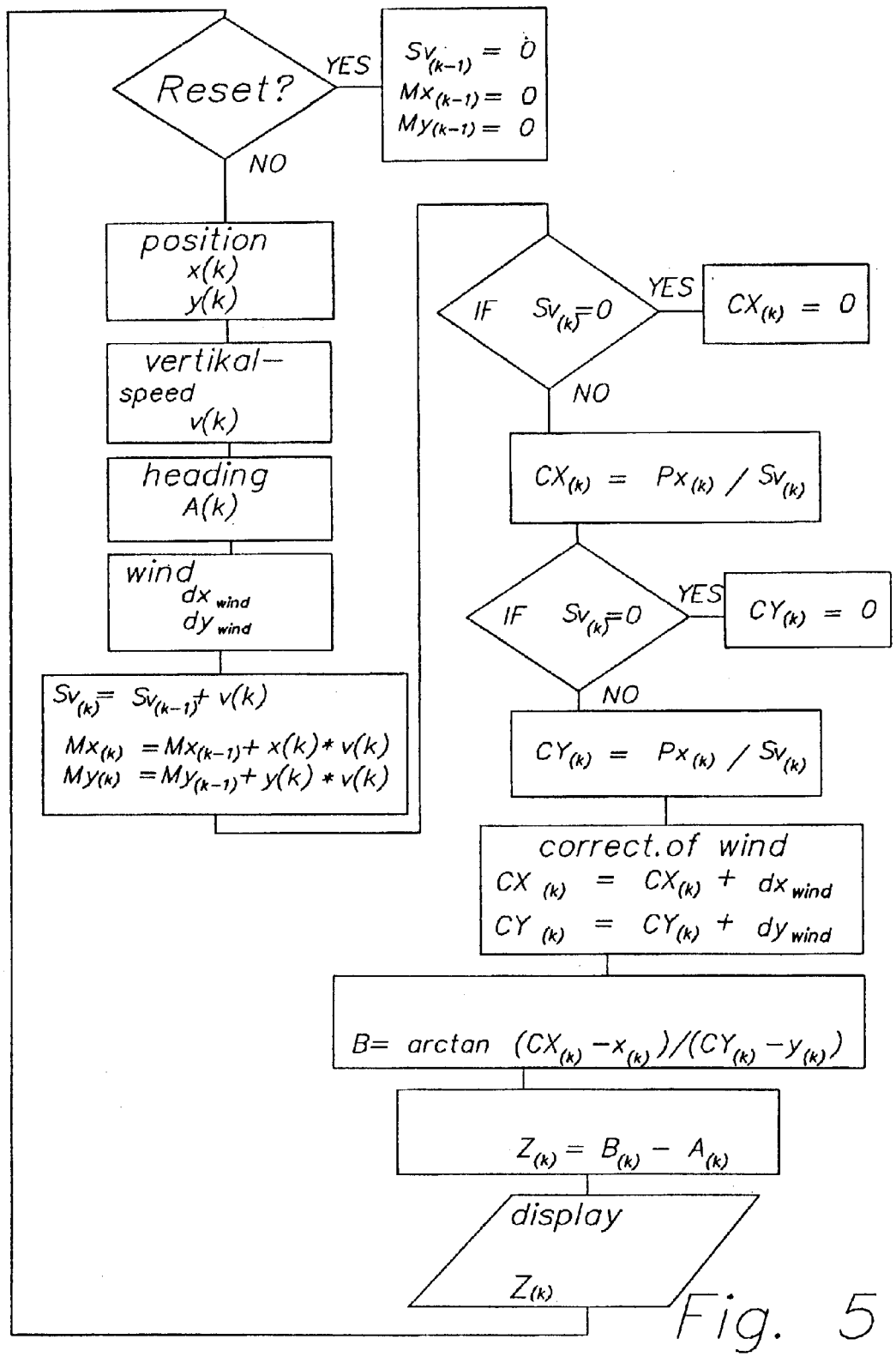
FIG. 5 shows a flow-diagram for the program which calculates the indication.

FIG. 5 shows a simplified flow diagram of the program for computing the data for the indicator. The program can be started, for example, by the pilot pressing a key, and continues to run in a loop. Every time the pilot wants to use the center flight indicator in a new thermal, a reset should be done. By the reset, all parameters of position and vertical speed will be set to zero.

Figure 6:
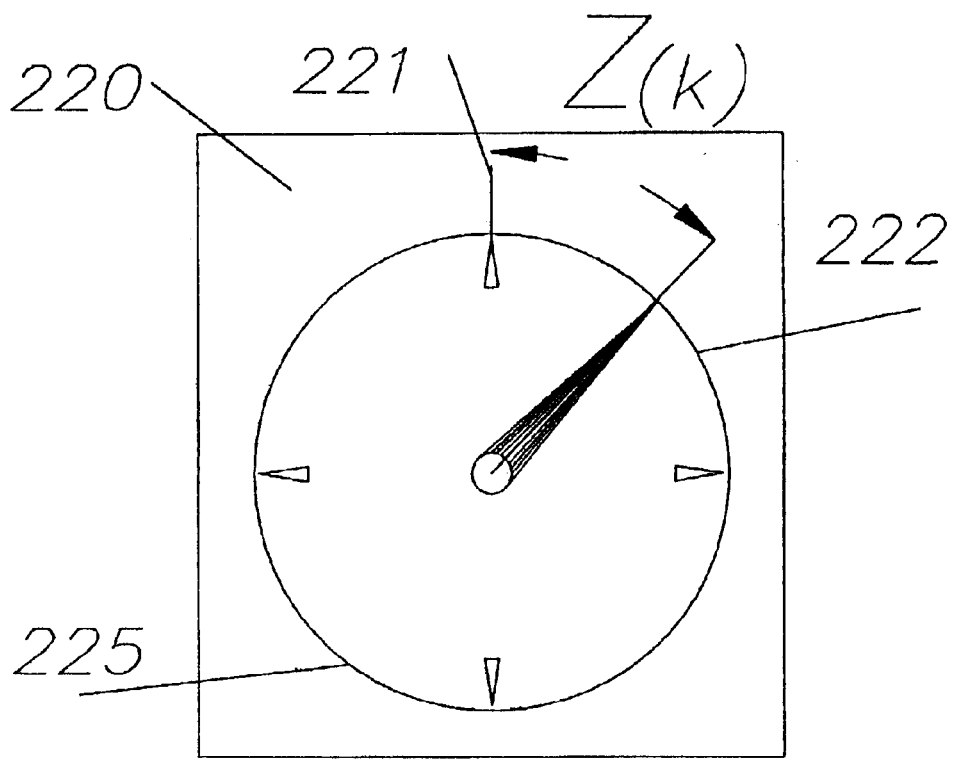
FIG. 6 shows an indicator with circular display.

FIG. 6 shows an indicator (220) with circular display of the center angle Z. It may contain a liquid crystal display, light-emitting diodes or comparable displays. The indication of the angle 0 degrees (221) means that the center of the thermal is straight ahead and that it is recommended to fly straight. If for example the hand moves from angle zero to angle 60 degrees (222), the pilot knows that he is already close to the center and that he soon will have to use a smaller radius of turn. With an angle of 90 degrees the glider flies orthogonally to the center and should turn using the proper angle bank. In case the center is behind the glider, the hand will go, for example, to angle –150 degrees (225).

Figure 7:
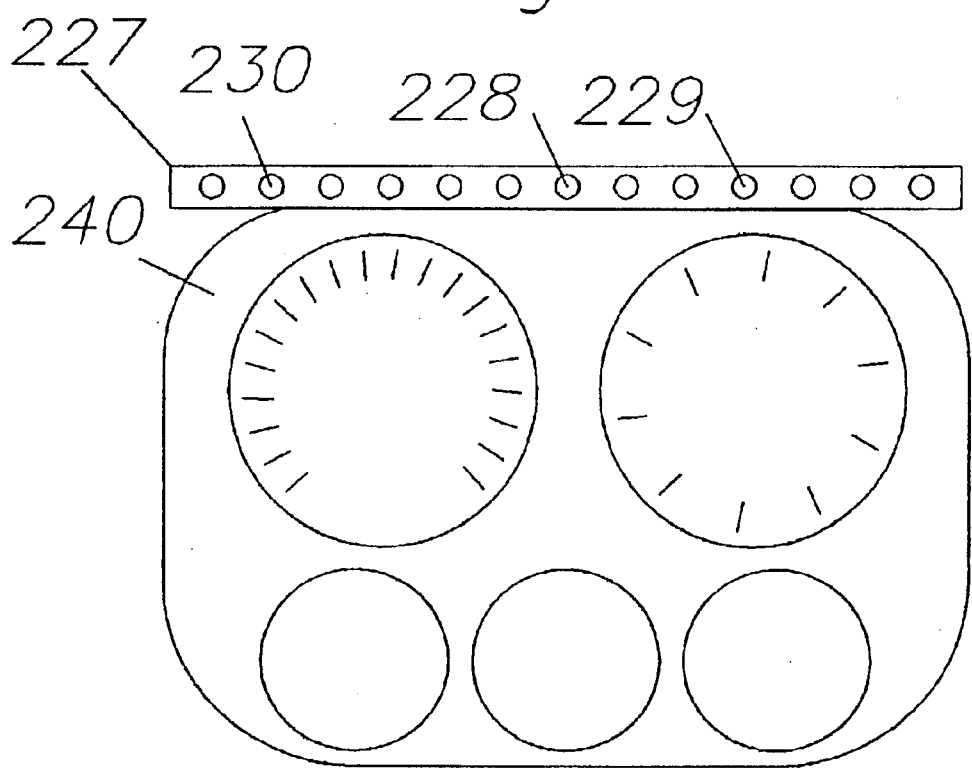
FIG. 7 shows an indicator with linear display.

A further way of configuring the indicator is shown in FIG. 7. Here, a line of light-emitting diodes (227) is attached to the upper edge of the instrument panel. They are activated according to the center angle Z. In case angle Z equals zero, the light-emitting diode (228), which is situated in the middle, is activated. In case angle Z equals +90 degrees, light-emitting diode (229) is activated and for Z equaling –150 degrees, light-emitting diode (230) is activated.

Figure 8:
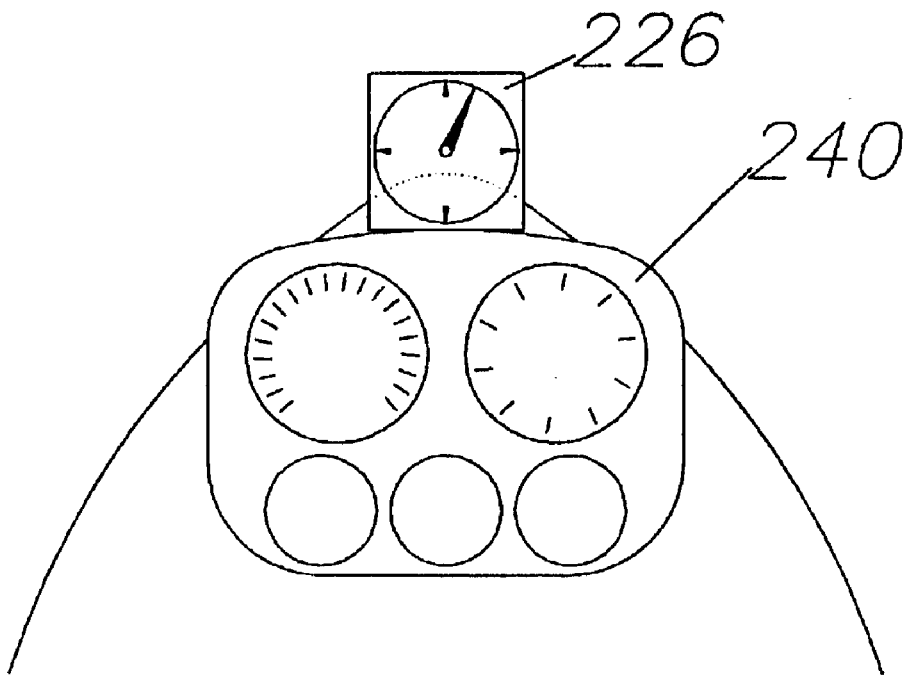
FIG. 8 shows an indicator with circular display in the cockpit.

FIG. 8 shows an indicator with circular display (226) in the cockpit. In this case, a transmissive liquid crystal display is attached above the instrument panel (240). It is in the normal view of the pilot and doesn't significantly hinder the view to the front.

Figure 9:
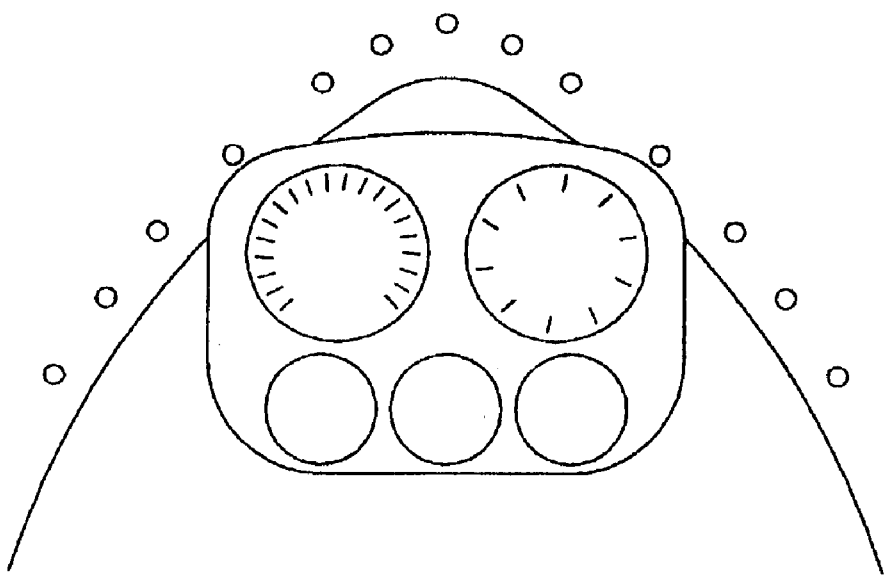
FIG. 9 shows a further indicator with linear display in the cockpit.

According to FIG. 9, light emitting diodes are attached to the lower part of the canopy glass within the view of the pilot. They are activated in a way similar to the light-emitting diodes of FIG. 8. This layout has the advantage that the active light-emitting diode indicates the direction to the center directly through its spacial position to the pilot.

There are numerous other ways for the realization of the invention which are not shown here. For example, the indication can additionally be done acoustically. A certain acoustical signal could indicate that the angle Z is between 60 and 90 degrees or between –60 and –90 degrees, determining to increase the turn radius. A different acoustical signal could be released if the angle Z is in the region of 90 to 120 degrees or between –90 to –120 degrees. This indication would signal to reduce the turn radius.

A further realization of the invention could contain an indicator for the distance between the present and the computed center. This indicator would indicate constant distance if the circular flight would be optimally centered. Such a distance indicator would be an additional help for the pilot if the circular flight were not yet centered. The indicator for distance could contain a bar of optical elements which could be activated similar to a thermometer bar, or could be activated as only one element of the bar at a time.

The specification incorporates by reference the disclosure of German priority documents 19731 081.8 of Jun. 30, 1997 and 197 27 859.0 of Jul. 19, 1997.

The present invention is, of course, in no way restricted to the specific disclosure of the specification and drawings but also encompasses any modification within the scope of the appended claims.

What is claimed is:

1. A thermal center flight indicator for gliders using thermals by flying circles, comprising:
   a position-fix-unit (301) which cyclically measures present position (Pxy);
   a variometer (302) which cyclically measures present vertical speed (v); and
   a computing unit (304) which operates cyclically and computes a product of positive vertical speed (v) and present position coordinates (xy), wherein said computing unit sums up all products of position coordinates and positive vertical speed, and wherein said computing unit (304) forms coordinates (Cxy) of a thermal center by dividing a sum of all products of position coordinates and positive vertical speed by a sum of all positive vertical speeds.

2. A thermal center flight indicator according to claim 1, wherein said computing unit 304 computes a thermal center angle Z, which is included between a present heading and a line which connects a present position and said computed center Cxy.

3. A thermal center flight indicator according to claim 2, which further comprises an indicator having at least one optical element which is arranged approximately symmetrical to a main axis of the glider and which can be activated for indication purposes.

4. A thermal center flight indicator according to claim 3, wherein said at least one optical element is activated in predetermined ways when a computed center is located within a predetermined angle relative to a present heading of the glider.

5. A thermal flight indicator according to claim 2, which further comprises at least one acoustic indicator, which can be activated for indication purposes.

6. A thermal center flight indicator according to claim 5, wherein said at least one acoustic indicator is activated in predetermined ways, when a computed center is located within a predetermined angle relative to a present heading of the glider.

7. A thermal center flight indicator according to claim 2, which includes means for indicating or signaling a distance between a center of a thermal and an actual position of the glider.

8. A thermal center flight indicator according to claim 2, which includes at least one signal unit that produces signals that are a function of the size of said center angle.

* * * * *

UNITED STATES PATENT AND TRADEMARK OFFICE
CERTIFICATE OF CORRECTION

PATENT NO : 6,089,506
DATED : July 18, 2000
INVENTOR(S): Bernd W. Scheffel

It is certified that error appears in the above-identified patent and that said Letters Patent are hereby corrected as shown below:

On the title page, the following item should read as follows:

Jun. 30, 1997 [DE] Germany..........197 31 081

Jul. 19, 1997 [DE] Germany..........197 27 859

Signed and Sealed this

Seventeenth Day of April, 2001

NICHOLAS P. GODICI

*Attest:*

*Attesting Officer*  *Acting Director of the United States Patent and Trademark Office*